United States Patent [19]

Lowe et al.

[11] Patent Number: 5,695,401

[45] Date of Patent: *Dec. 9, 1997

[54] PLAYER INTERACTIVE LIVE ACTION ATHLETIC CONTEST

[75] Inventors: Danny D. Lowe, 37 Woodhaven View, S.W., Calgary, Alberta, Canada; Gordon G. Wilson, Calgary, Canada; Michael E. Baker, 2712 17 St. N.W., Calgary, Alberta, Canada, T2M 3S4; Abram Gamer, 139 Oakside Circle S.W., Calgary, Alberta, Canada, T2V 3H4

[73] Assignees: Gordon Wilson; Danny D. Lowe; Michael E. Baker; Abram Gamer, all of Calgary, Canada

[*] Notice: The term of this patent shall not extend beyond the expiration date of Pat. No. 5,462,275.

[21] Appl. No.: 348,731

[22] Filed: Dec. 2, 1994

Related U.S. Application Data

[63] Continuation-in-part of Ser. No. 811,226, Dec. 20, 1991, Pat. No. 5,462,275.

[51] Int. Cl.$^6$ ...................................................... A63F 9/00
[52] U.S. Cl. .................... 463/4; 364/410; 463/31; 463/35; 463/43
[58] Field of Search ..................... 463/4, 31, 35, 463/43; 364/410

[56] References Cited

U.S. PATENT DOCUMENTS

| | | | |
|---|---|---|---|
| 4,249,735 | 2/1981 | Bromley | 273/94 |
| 4,304,404 | 12/1981 | Pundt | 273/85 G |
| 4,327,915 | 5/1982 | Bromley | 273/94 |
| 4,342,454 | 8/1982 | Baer et al. | 273/85 G |
| 4,357,014 | 11/1982 | Baer et al. | 273/85 |
| 4,391,444 | 7/1983 | Bromley | 273/94 |
| 4,422,639 | 12/1983 | Del Principe et al. | 273/94 |
| 4,582,323 | 4/1986 | Minkoff et al. | 273/94 |
| 4,662,635 | 5/1987 | Enokian | 273/94 |
| 4,766,541 | 8/1988 | Bleich | |
| 4,799,677 | 1/1989 | Frederiksen | 273/435 |
| 5,026,058 | 6/1991 | Bromley | 273/88 |
| 5,067,079 | 11/1991 | Smith, III et al. | 364/410 |
| 5,462,275 | 10/1995 | Lowe et al. | 463/4 |

FOREIGN PATENT DOCUMENTS

| | | |
|---|---|---|
| 1221761 | 5/1987 | Canada . |
| 1232093 | 1/1988 | Canada . |
| 1236217 | 5/1988 | Canada . |
| 8302566 | 8/1983 | WIPO . |

Primary Examiner—William H. Grieb
Attorney, Agent, or Firm—W. Charles Kent; William R. Edgar; R. Lewis Gable

[57] ABSTRACT

A player interactive live action football game which may be played for example on a television screen. A player interactive live action football game is provided which comprises a random access storage and retrieval device and a plurality of individual, pre-recorded action football plays illustrating interaction of players of opposite teams. This information is stored in random access storage and retrieval device and accessible according to type of play. The invention further comprises a microprocessor and microprocessor control device electronically associated with the random access storage and retrieval device. The microprocessor is programmed to enable one or more users to select in sequence, through the control device, different football plays according to play type. A display device is electronically associated with the microprocessor to enable the selected plays to be viewed by the users. The microprocessor is further programmed to evaluate and cumulate play results and report them to the users in a meaningful way.

14 Claims, 5 Drawing Sheets

PLAYER INTERACTIVE LIVE ACTION ATHLETIC CONTEST

The present application is a continuation-in-part of application Ser. No. 07/811,226 filed Dec. 20, 1991, now U.S. Pat. No. 5,462,275.

FIELD OF THE INVENTION

The present invention relates to a player interactive live action athletic contest such as a football game which may be played for example on a television screen.

BACKGROUND OF THE INVENTION

Video games featuring sports including football are well known. Such video games generally incorporate computer generated graphics stored in a memory and accessed by a computer. Examples of such computer graphics video games are described and illustrated in Canadian Patent No. 1,221,761 issued May 12, 1987 of Hueda et al, Canadian Patent No. 1,236,217 issued May 3, 1988 of Bromley et al and Canadian Patent No. 1,232,093 issued Jan. 26, 1988 of Tatsumi et al.

U.S. Pat. No. 4,766,541 issued Aug. 23, 1988 of Bleich et al describes and illustrates a video game or the like which includes a real time interactive video disc game-play background generation system. The discs contain video data which is under the control of the game processor, whereby the sequence of frames to be played can be varied on a frame by frame basis.

Other references of general background interest teaching electronic simulated sports games include U.S. Pat. No. 4,662,635, Enokian issued May, 1984; U.S. Pat. No. 4,304,404, Pundt issued December, 1981; U.S. Pat. No. 4,799,677, Frederikson issued January 1989; U.S. Pat. No. 5,026,058 issued June, 1991 and U.S. Pat. No. 5,067,079, Smith et al issued November, 1991. Of particular interest, U.S. Pat. No. 4,662,635 of Enokian teaches that video images of players engaged in a series of athletic plays be displayed on a television screen while the field position is calculated and displayed on a separate, lighted panel representing a football field.

SUMMARY OF THE INVENTION

In accordance with the present invention a pre-recorded, live action and sound, full motion video, interactive athletic contest which comprises players of opposite teams playing at various positions on a background field. The game comprises a random access storage and retrieval means, the random access storage and retrieval means for storing a plurality of individual, pre-recorded video images representative of live action plays of the athletic contest illustrating interaction of players of the opposite teams. The game further comprises a microprocessor and microprocessor control means electronically associated with said random access storage and retrieval means for enabling one or more users to select in sequence through said control means different ones of said plays according to play type, the microprocessor then, by using statistical tables, to select the video image of the actual play according to play type selected by the user. A display means is electronically associated with said microprocessor enabling the selected plays to be viewed by the users. The microprocessor is further programmed to evaluate and accumulate play results and report them to the users in a meaningful way.

Preferably the live action football plays are recorded on a football field complete with all markings normally found in an American style football game, with a limited number of field positions from which the ball can be scrimmaged so that all plays originate and complete on one of a limited number of pre-selected lines of scrimmage.

The football game according to the present invention may store the video material using laser disc technology CD-ROM, computer hard drive or other storage means allowing random access retrieval, and may also store audio material for real-time playback of voice, music and sound effects. The game as played appears to the viewers to be a real television broadcast of a live game, the content of which is dictated by selections of plays by the users.

The game according to the present invention is unique in that it permits the viewer to interact with what appears to be an actual televised professional American style football game.

In order to make this game appear to be an actual televised football game, several unique design features are used. First, there are no prompts or messages to the game players appearing on the television screen since these or any other "computer game" type of instructions would not appear in a real television broadcast. All game instructions and player prompts are issued through the individual game controllers controlled by the game players. These game controllers feature a display means to prompt players with game status messages and request input response to effect proper game play. The television screen only displays what would normally be seen in a real televised game.

Secondly, the video display sequences (e.g. opening, closing, football plays, commercials, status screens etc.) are in "video" terms, each video sequence is edited in real time to the previous video sequence with a simple "cut" edit or with a "dissolve" or "wipe" video transition effect. The end visual result is a continuous video/audio display without any pauses, gaps or break in the video/audio display. The dissolve or wipe transitions require the extensive generic mapping of each video sequence as described later in this document and illustrated in FIG. 4 so that two video sequences may be properly controlled and timed so that the end of the previous video sequence overlaps the start of the next video sequence so that the wipe or dissolve can be properly displayed. This technique is known in the video production industry as an "A/B Roll Edit".

Thirdly, not apparent in the display means, but necessary to produce the above described video transitions, the computer software and the hardware video display drivers (whether they be for NTSC video playback of laser video disc or video decompression and playback of digital video from hard drive or CD-ROM or the like) must be capable of controlling two video display devices simultaneously in real time so that the A/B rolls overlap.

It is an object of the present invention to provide an interactive, live action football game that can be played by one or more persons in a home, bar or the like. It is a further object of the present invention to provide such a television game which permits the players to select full motion video images, as opposed to computer generated graphics, to play such game and determine the outcome.

BRIEF DESCRIPTION OF THE DRAWINGS

These and other objects and advantages of the invention will become apparent upon reading the following detailed description and upon referring to the drawings in which.

Figure 1:
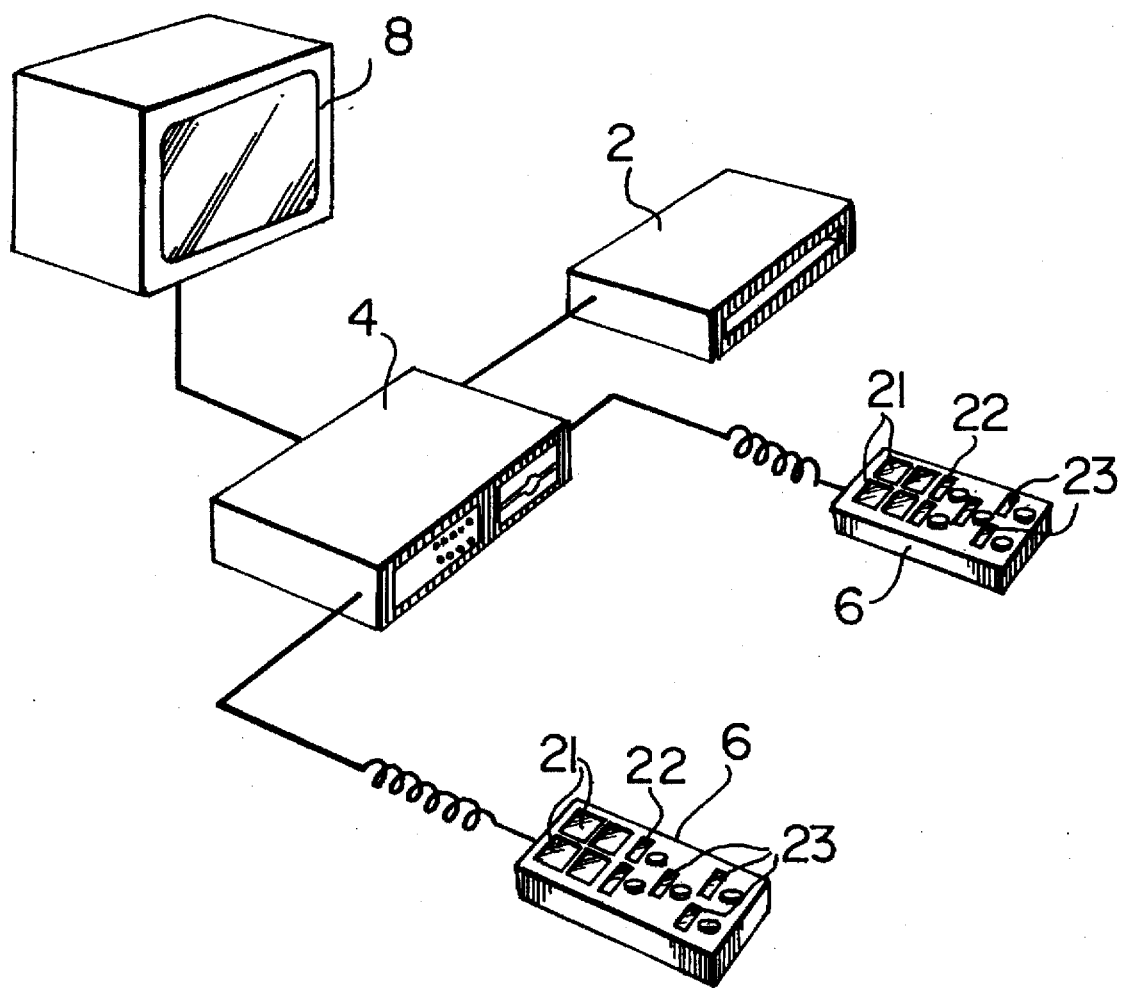
FIG. 1 is a schematic view of the game components of the game in accordance with the present invention.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

FIG. 1 illustrates schematically the various hardware components of the football game system in accordance with the present invention. A random access storage and retrieval means 2, preferably a laser disc storage device 1 is electronically associated with a microprocessor 4, control modules 6 and T.V. monitor 8 as illustrated. Laser video disc storage device 2 preferably additionally provides for storage and retrieval of audio information on audio channels. Alternatively, audio information may be stored on a separate, audio storage means (not illustrated) with audio information being correlated to video information by means of microprocessor 4.

Figure 2:
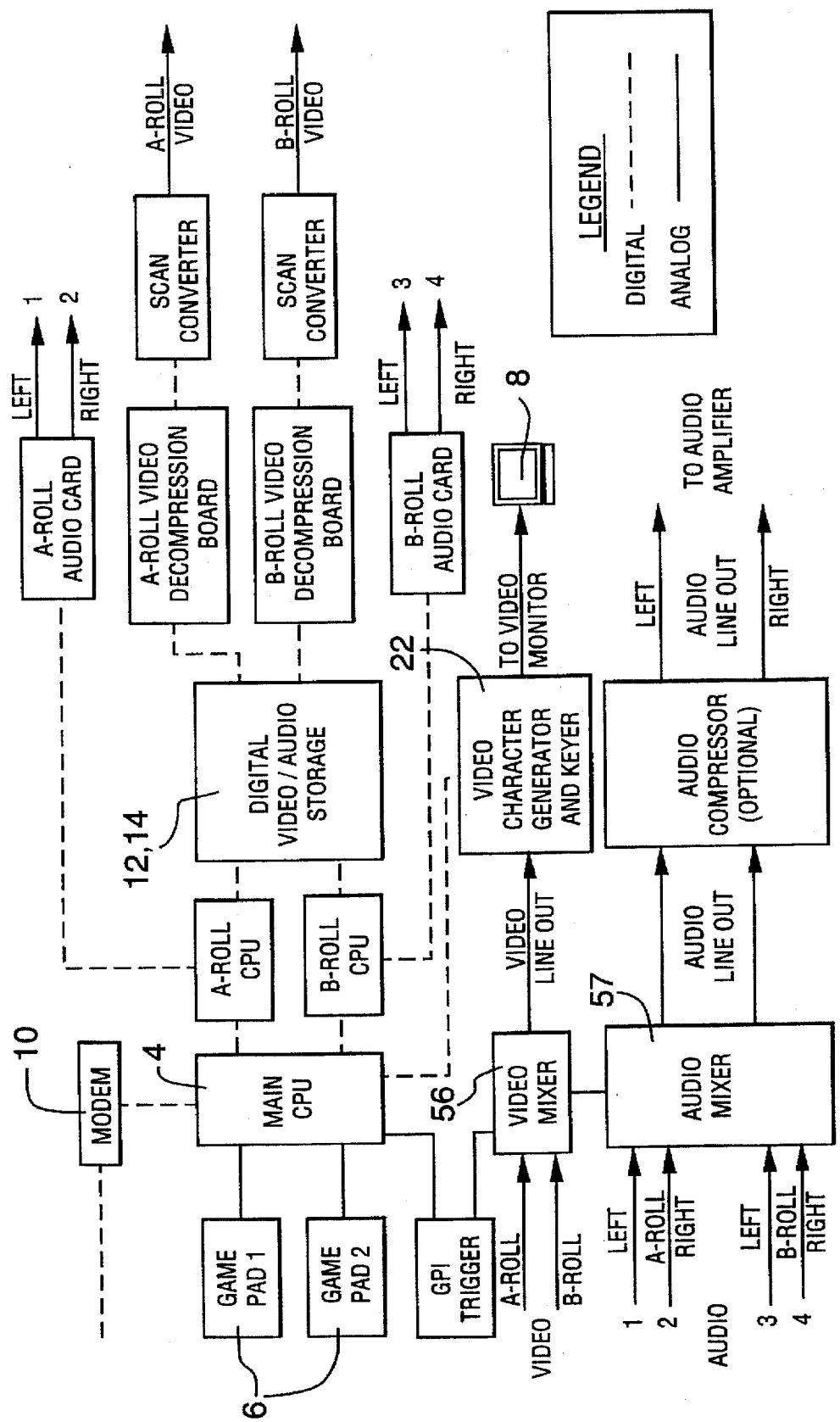
FIG. 2 is a schematic block diagram showing the component layout of the game according to the present invention.

In more functional terms, the main components of the game system according to the present invention are illustrated in FIG. 2. These components may be defined as eight basic components:

1) input devices 6
2) central processing unit 4
3) modem 10
4) video storage/retrieval means 12
5) audio storage/retrieval means 14
6) video/audio routing means 56, 57
7) T.V. monitor 8, audio amplifier and speakers
8) graphics character generation means 22

With the exception of the T.V. monitor and two game pad control modules 6, all of these components may be physically contained in a single enclosure or cabinet.

The input devices include the two game pad control modules 6 and a signal receiver (not illustrated) in main computer unit (CPU) 4. Game pad control modules 6 communicate to the signal receiver using either infrared pulses, ultrasonic audio waves or low powered radio waves with a pulse code modulated security code. The game pad control modules 6 preferably have five input buttons that control all game functions. Each input command on the game pad control module will be accompanied with an appropriate prompt on the game pad control module's LED or fluorescent LCD display. The display information is broken into four main sections:

1) prompt display
2) timer display
3) status display
4) input display

The prompt display is the main display 21, located near the top of the game pad controller, that will prompt the player for the next input or tell them to wait or display other such information. The display will flash a message soon as either the word <SELECT> or the word <WAIT>. To the right of this flashing prompt, on the same prompt display line, there will be a 20 character display that will indicate the type of selection required (i.e. Type of Play) or explain the wait condition (i.e. Time Out Called).

Preferably in the upper right corner of the game pad controller, there is a two digit numeric display 22 with large sized characters. This numeric display is the Clock Timer display and will indicate the amount of time left to enter a decision once a prompt has been issued. The preferred standard countdown during a play sequence will be from 15 or 20 seconds backward to zero. If an offensive call has not been made by that time, a Delay of Game Video Sequence will be played giving extra time to the offense to enter a decision. If no decision is entered by the end of the Delay of Game Video Sequence the game will be terminated and awarded to the other team.

In addition to the <SELECT> input prompt and the numeric Countdown Timer display, there is also a 14 character alphanumeric display 23 beside each of the 5 input buttons. These displays will identify the input command for each button. For example, if the prompt requests "<SELECT> Type of Play", then to the right of each of the 5 inputs buttons will be a display showing the type of play that button will select.

Example:

| <SELECT> | Type of Play |
|---|---|
| | Run |
| | Pass |
| | Kick |
| | Time Out |
| | Quit |

If "Run" is selected then the Prompt Display and the five Input Displays will change to read:

| <SELECT> | Type of Run |
|---|---|
| | Run Left |
| | Up the middle |
| | Run right |
| | Time out |
| | Quit |

It is not intended in this description to place an upper or lower limit on the number of types of play that can be selected and displayed on this screen. Since there are five input selection buttons described here there may be as many as five types of play used in the final release version of this game or on later upgrades and versions. If five types of play are offered then they would preferably be:

Wide left
Dive right
Up the middle
Dive right
Wide right

There may also be as few as only two type of play offered, for RUN plays the display would preferably read:

Left
Right
(blank)
Time Out
Quit

For Pass plays there would preferably be (but not limited to) one of the following variations:

| | | |
|---|---|---|
| Left | Left | Deep Left |
| Right | Center | Short Left |
| (blank) | Right | Up the middle |
| Time out | Time out | Short Right |
| Quit | Quit | Deep Right |

It is not the intent in this description to limit the description of each play to only those used in these examples.

The selected response is then received by CPU 4 and processed along with other game factors, as will be described in more detail hereinafter, to determine which video play sequence or other video sequence (such as Time Out, etc.) will be used next. It will then communicate with the other components in the system to set up the next video sequence.

CPU 4 also locates where all video and audio elements are stored in video storage and retrieval means 12 and audio storage and retrieval means 14. Then commands are issued to the proper device controllers to cue up the first video and audio elements needed to start the sequence.

Video storage and retrieval means 2 can be any video storage system that has sufficient storage capacity for the required program, providing it is capable of random access, within the limited time frame of the parameters of the game, to all video and audio sequences stored in this medium. Suitable storage mediums that meet these requirements include laser video disc, CD-ROM compact disc and RAM hard drive. (Video stored in a digital format will probably use compression techniques such as Intel's "DVI System" (Trade-mark)). As new storage mediums are developed any medium meeting the storage and random access requirements of the present invention can be used.

The video images stored in this medium will be full motion video (i.e. thirty video frames per second). These images can be stored in analog form as on a Laser Video Disk (CAV or CLV formats), or as compressed digital data (CD-ROM) using video compression techniques. The resolution of the image may vary depending on the type of system used but in all cases the final video output will match the video system used in the country or region of use. In North America for example, the video output will be NTSC Standard. In Europe it will be a PAL/Secam dual format. A Standards Conversion Unit can be installed down stream from the system so that all images are stored and controlled in NTSC format with the final video output going through the Standards Conversion Unit converting it to PAL/Secam. The other alternative is to store and display the video data entirely in the local broadcast format used and, since the video frame rate for PAL/SECAM is 25 video frames per second, this would require rewriting the control program and data base to work with a video frame rate in base 25 rather than base 30.

The audio storage and retrieval means 14 can utilize several different formats. More than one of these formats may be utilized in the final design. The major storage format will be in accordance with the final video format used. If, for example, the final video format is Laser Video Disk, then most of the audio will be stored on the existing audio tracks used on Laser Video Disk. This format will permit the use of two audio tracks that share common frame numbers with the video portion. In other words, for each addressable video frame on the Laser Video Disk as there are two corresponding audio frames with the same address. Additional audio tracks can be located on other Laser Video Disks run in sync with the main video sequence. Another possible source is a CD-Audio Company (Trade-mark) Disk running in sync with the video using a similar frame code addressing system. Digitized sound can also be stored on hard disk drive for extremely fast random access. Regardless of the storage format used, the audio storage requirements are the same as the video storage requirements in that they must have large capacity and random access capability within the limited time frame parameters of the game.

The graphic character generation means 22 generates graphics such as game statistics and players names for the video inserts and stats boards. This generator is required to generate characters and simple lines for underlining titles. It must generate several sizes of font in different colours.

In analog format all graphics are routed to the video/audio switcher(s) and graphics keying device 18 for insertion into the video picture. In digital format the graphic will preferably be inserted downstream from the video/audio switching device(s). The video/audio switcher(s) 18 can be either analog or digital. In analog form the device would be a standard video/audio switcher controlled by the main CPU through a General Periphery Interface (GPI). The video switcher would generate the wipe effects that link the video sequences together and it would include a graphics keying device. The graphics keying device enables the system to insert graphics over the entire picture (i.e. score inserts, statistics, players names etc.). In digital format the character generator would contain circuitry to insert or overlay graphics downstream from the video/audio switching device(s).

In analog format the video switcher also manages audio routing of the final mixed audio. In digital format the audio will be routed separately from the video picture and taken directly from the A-Roll/B-Roll audio cards (or audio outputs on the video decompression cards if available) to an audio switcher device.

There are a number of low cost analog switching devices available on the market. In the digital domain, video and audio switching as well as graphics keying can be handled with a number of "off the shelf" VGA to video adaptor cards currently available for the IBM platform. Many of these cards allow the use of wipes and keys in their basic format as well as a number of other Digital Video Effects (DVE) that can be incorporated into the production design of the program. Providing they support simultaneous video input and display from two pre-recorded video sources.

The modem 10 will operate under control of the CPU 4. During play it may feed control program information through to other game systems at other locations. When the system is not being used it will periodically report back to a central service center and database (not illustrated) supplying current information on usage for marketing analysis as well as reporting back to the service center for any trouble or equipment failure.

Figure 3:
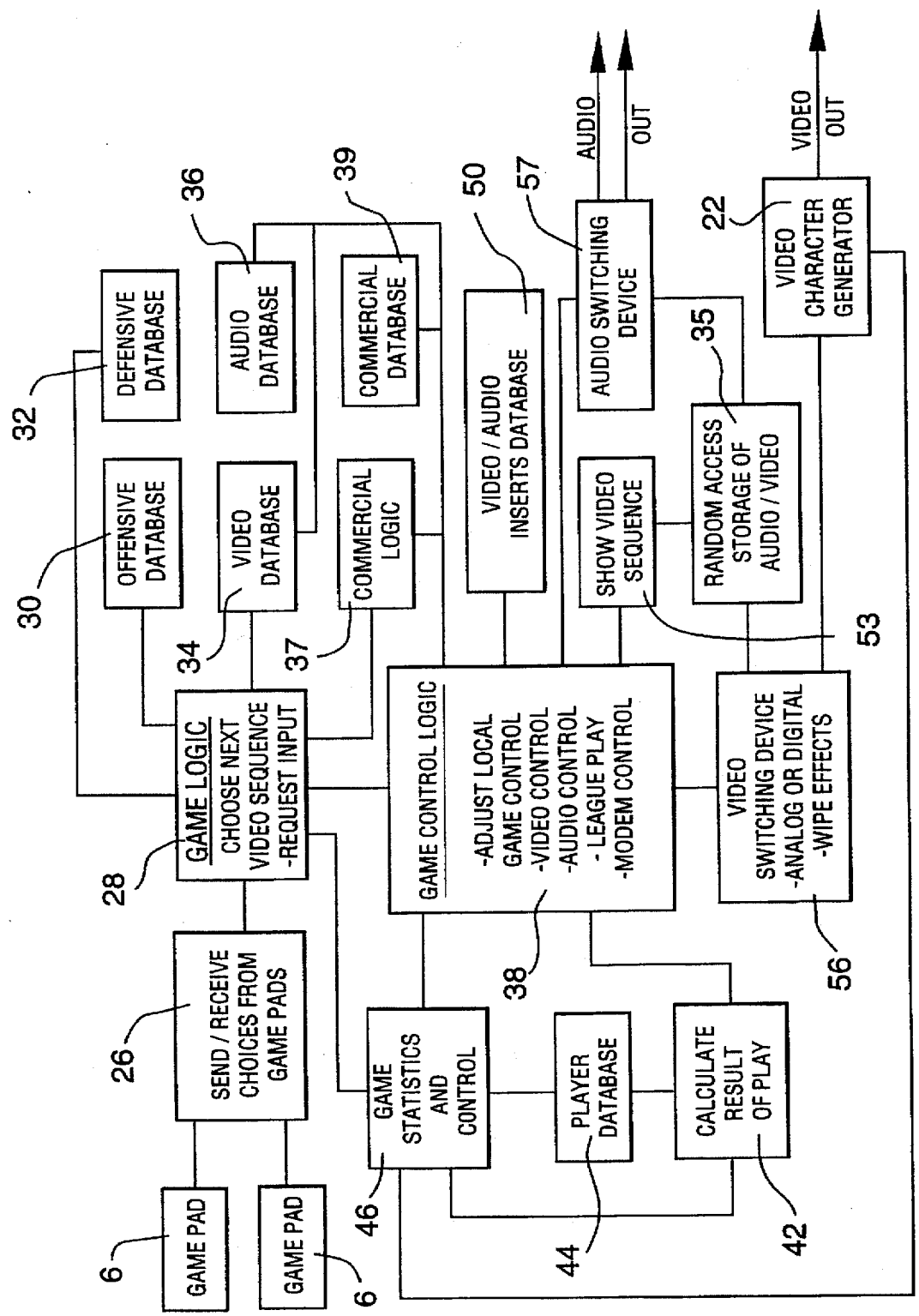
FIG. 3 is a software block diagram of the game of the invention.

The software operating CPU 4 will be described now in more detail, having reference to the software block diagram of FIG. 3. The two game pad controller modules 6 are used to display information and options to the players and send the choices back to the computer via send/receive choices from game controllers 26.

The game logic 28 uses data from the send/receive choices from game pad controllers 26 to choose the next video sequence and to send information back to or request input from the game pad controller modules 6.

The offensive database 30 contains the information to rank the basic effectiveness of an offensive call.

The defensive database 32 contains the information to rank the effectiveness of each defence called versus the offense called.

The video database 34 contains information on every video sequence stored in random access storage of video/audio 35. The timing information for each video sequence is also located here and accessed by the video control logic 36.

The commercial logic or advertisement logic 37 works with the game control logic 38 to determine when and where commercials should be played.

The commercial or advertisement database 39 contains information on every commercial in random access storage and keeps a record of how many times and when each one is played.

The adjust local game control function of game control logic 38 will pass on information about the current video sequence to calculate the result of play at 42. The adjust local game control 38 also manages the logic for the timing and control of all video and audio sequences as well as the control program for the modem link.

The player database 44 contains the profile information on every player in the game. It is updated every time a result of play calculation is made.

The results of play calculations are also passed on to game statistics and control 46 which provides information on score, momentum, player and team performance and game control variables.

The video/audio inserts database 50 stores information on all inserts that are available to the video control logic.

The show video sequence 53 controls the driving of video and audio devices such as laser video disks, CD-Rom etc.

The random access storage of video/audio 35 contains all video and audio material. The number and types of devices may be intermixed and include such devices as laser video disk, CD compact audio disc, CD-Rom, computer hard drive and any other random access storage devices.

The analog or digital video switching device 56 and audio switching device 57 are controlled by the video game control logic 38 and switches between all video and audio signals. In analog format this device also contains a graphics keying device for keying in the graphics from the graphics character generator 22. In digital format the graphics keying will be downstream from the video switching device 56 and controlled by the video game control logic.

Figure 4:
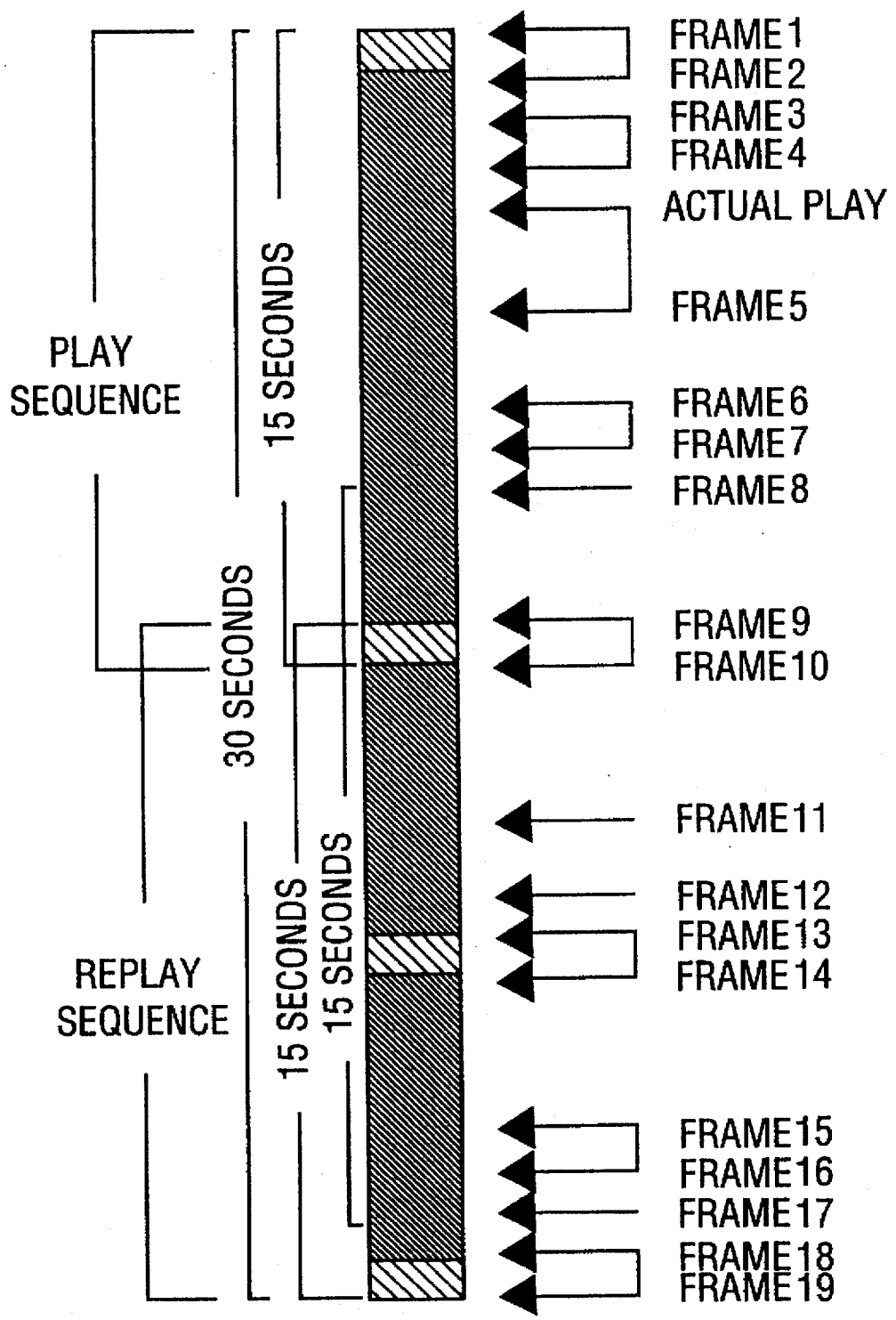
FIG. 4 is a schematic diagram of a video play sequence breakdown for the game in accordance with the present invention.

An important aspect of the game according to the present invention is the play sequence as illustrated in FIG. 4. This frame mapping, applied to all video sequences used in the game, gives the game software a standardized set of cueing and timing points to be used to facilitate the simultaneous and synchronized play of any two video sequences in order to perform a continuous series of seamless "A/B roll" video edits throughout the game. To illustrate this FIG. 4 represents the video play sequence which is the basic video unit of a Sports Active Television Football Game.

The video play sequence consists of two main parts:
1) REALTIME PLAY
2) SLOW MOTION REPLAY In particular, the illustrated frame positions represent the following:

Frame Position 1 starts the video play sequence and marked the beginning of a 1 second wipe or dissolve video transition from the previous video sequence. This is also the start of the REALTIME PLAY portion of the video play sequence.

Frame Position 1 also marks the main edit in point for the audio track and unlike the 1 second video transition, the audio is a straight cut take.

It is important to keep clear and understand that although the main video edit point has already passed and the audio has been edited, the previous video sequence continues on until the 1 second wipe effect is finished at Frame Position 2.

Frame Position 2 marks the end of the 1 second video transition and the end of the previous video sequence.

The first optional audio window begins at Frame Position 3 and ends at Frame Position 4. This audio window is a 2.5 second portion of the existing sync dialogue of the Play By Play announcer that can be deleted without breaking continuity in the flow of the dialogue and replaced with a voice insert by the same announcer giving yardage and field position updates.

An important feature of the first optional audio window is that it occurs BEFORE the ball is brought into play.

The start of the actual football play (i.e. snap of the ball), is not recorded with a frame position number since it is not important in the timing of the video play sequence.

The end position of the actual play is important however since it occurs when the referee blows his whistle and the ball is taken out of play. The point at which the whistle is blown is designated as Frame Position 5. During normal game play the game clock will continue to run throughout the entire video play sequence except in the last two minutes of the first half and the last two minutes of the game. During these two 2 minute periods the game clock will stop at Frame Position 5 in every video play sequence and restart at Frame Position 1 in the next video play sequence.

Frame Position 6 and Frame Position 7 mark the location of the in and out points of another optional audio window. This window occurs after the ball has been taken out of play and a new field position and/or down has been established. This gives the Play by Play narrator the opportunity to say where the ball has ended up and what the downage situation is so that the players in the bar can be informed for their next play decision.

NOTE: There will also be LED readouts of yardage and downs on each player's game pad display. These readouts will be dedicated to this specific function and visible to the players at all times during normal play of the game. (See Section 19—Main Component Layout)

Both audio windows at Frame Positions 3 and 4 and Frame Positions 6 and 7 as well as a third audio window to be described later at Frame Positions 14 and 15 are optional audio windows that will not be automatically used every time they occur. These audio windows will be used at random intervals to vary the structure of the video play sequence format. The amount of randomizing will be determined in Alpha/Beta testing of the prototype game and will probably favour the second audio window since it occurs after the current play has been completed, therefore the updated information in the second optional audio window (Frame Positions 6 and 7) is more useful to the bar players since they must now make their next play decision.

However, since it is intended to use all three optional audio windows to vary the format of the video play sequence, there may be occasions when more than one window is used in the same play. If more than one audio window is used during a video play sequence then it should be a combination of the first optional audio window (Frame Positions 3 and 4) plus one of the other two windows that occur after the ball is taken out of play. This would give the current yards and downs before the play and the new yards and downs after the play is completed. This type of audio insertion has the added benefit of making the Play by Play announcing appear to actually be in real time.

Frame Position 8 marks a timing location backtimed 22 seconds from the end of the video play sequence that will trigger the game pads to prompt for the next player input. This position is independent of the start of the slow motion replay portion of the video play sequence, but will always occur after the ball has been called out of play. The exact location of Frame Position 6 will be the total number of seconds before the end of the video play sequence (Frame Position 18) that is needed to give the bar players 20 seconds to make their next play decision inputs, plus 1 second seek time to locate the next video sequence plus 1 second for the video transition.

Frame Position 9 marks the start of the video transition between the Realtime Play portion of the video play sequence and the slow motion replay portion. Frame Position 9 also locates the start of the next video sequence which would normally be the corresponding slow motion replay of the previous Realtime Play sequence however the slow motion replay may be occasionally substituted with a short commercial break or a player or game statistics graphic. If a substitution is made then then video or graphic sequence used should be of equal average length to the slow motion replay sequence which will be on average 20 seconds.

Frame Position 9 also marks the position at which the audio for the realtime play portion ends and the audio for the next sequence is taken up full with a straight butt cut edit.

Frame Position 10 marks the end of the 1 second video transition between the realtime play and the slow motion replay (or its substitute) portion of the video play sequence. It also marks the end of the realtime play portion of the video.

Frame Position 11 will locate the offense input deadline position for an optional edit out point. If the offense has entered both play decisions by Frame Position 11 then the video play sequence will end at the optional edit out point at the end of the video transition at Frame Position 14. If the optional edit out point is used then the audio for the slow motion replay will end at the beginning of the video transition at Frame Position 13.

If the offense has made their input decisions by Frame Position 11 in time to invoke the optional edit point, the defense will be warned that they only have 5 seconds left to enter their defense calls. This warning will be visual in the form of a flashing LED display such as the countdown timer on the game pad, or it can be with a dedicated warning light on the game pad that would light and possibly flash when the offense enters a quick play decision.

Frame Position 12 is the input deadline of the defense to enter a play decision when the offense has made a quick call and invoked the optional edit out point. If the defense fails to respond by this time then a default defense call will be entered for them. This default will give them a bad defensive call as if they were caught off guard by the offenses quick play decision and the offense will gain yards on the play.

Frame Position 12 will be located 1 second before Frame Position 13 to allow for seek time to locate the next video sequence. There will also be 1 second between Frame Position 13 and Frame Position 14 to allow for the 1 second video transition.

The exact location of Frame Positions 11, 12, 13 and 14 will always remain 5, 1 and 1 second apart respectively but will vary as a group relative to the video play sequence since each play is different and the optional edit out point must be at a place where both video and audio can be edited without a break in video or audio continuity.

The reason for the optional edit out point at Frame Position 13 is to give the bar players the ability to speed up the pacing of the game for either enjoyment or strategy, by entering their play decisions quickly, within the first half of the time period allowed for entering a normal input response. This optional edit out point will shorten the video play sequence by approximately 10 seconds.

Frame Position 13 is the start of the video transition for the optional edit out point, the end of the audio track for the previous video sequence and the starting position for the next video sequence and the edit in point for the audio track of this next sequence.

Frame Position 14 is the end position for the video transition as well as the end of the video for the previous video sequence.

Frame Position 15 is the location of the start of the third and final 2.5 second optional audio window for yardage and down inserts.

Frame Position 16 is the location of the end of the third and final 2.5 second optional audio window.

Frame Position 17 marks the normal input deadline for the players to call the next play when the optional edit out point has not been invoked by a quick play call from the offense. If no play has been called by the offense, there will be a short commercial break, if they haven't entered a decision after the break another commercial break will be called and if there is still no response after this second break then the game will be called as described in Section 9.

Frame Position 17 will occur 1 second before Frame Position 18 to allow for seek time for the next video sequence.

Frame Position 18 marks the beginning of the 1 second video transition to the next video sequence. Frame Position 18 is also the start position for the next video sequence and is the position where the audio for the current video sequence ends and is edited to the audio at the beginning of the next video sequence. Frame Position 18 will occur 1 second before Frame Position 19.

Frame Position 19 marks the end of the 1 second video transition and the end of the video footage for the current video play sequence.

Where a sequence of plays are to be undertaken, the first step in this sequence will be to cue the main video element, such as a video play sequence (selected from laser video storage retrieval means 12) at a location prior to the desired video material that will provide sufficient time for lockup or synchronization of the video picture. If for example the video lockup time is one second, the cue position for the video sequence will be one second or thirty video frames before the edit in point of the cued video sequence. Then when the current play sequence, already in progress, reaches a position one second (thirty video frames) before its "edit out point", the next video sequence will start to roll and sync up with the current video sequence.

When the current video sequence reaches its edit out point, the CPU 4 will issue a command to the video switching device to start the video transition (Wipe Effect Edit) between the two video sequences. Since both video sequences will now be synchronized together, when the current play sequence reaches its edit out point, the new play sequence will reach its edit in point at the same time. Once the edit point is reached, the edit will take place and the video transition will begin.

The video transition will always have the current play sequence move off screen (i.e. wipe) over top of the next video sequence when the next video sequence starts in real time. This is almost always the case but one example of an exception would be when we insert a graphic for game statistics. If this insert occurs during live video from the current play the Insert should wipe in over the current sequence. The video transition cannot exceed the length of the video portions of the video sequence.

Once the final Frame Position on the current video sequence has been reached, that video source will go off-line and the new video sequence will continue as the current video sequence. In the meantime, the CPU 4 will be issuing similar instructions for the audio inserts that are to be inserted into the selected optional audio windows. It will determine whether the audio storage device is located and issue a command to the audio storage device to cue that insert an appropriate time ahead of the insert that will allow sufficient time for the audio to "lockup" with the video play sequence. When this position is reached, just prior to Frame Position 2 in the video play sequence, the audio disk will roll and get up to speed in synchronization with the video play sequence so that the starting location for the audio insert will correspond with Frame Position 2 (the beginning of the target audio window).

When the "in-point" at Frame Position 2 for the audio window is reached, the CPU 4 will instruct the video/audio switching device to mute the track containing the. Play by Play commentary and replace it with the audio insert. When Frame Position 3 is reached, the mute command will be revoked and the original Play by Play commentary will continue.

When the video play sequence reaches Frame Position 6 (FIG. 4), the CPU 4 will send a command back to the game controllers requesting the next input from the players for the next video sequence. This sequence will then repeat itself over again.

As to the question of grid lines, the pre-recorded action footage plays display normal field markings of yardage lines and numbers, with a limited number of lines of scrimmage available to the player, so that the results of each play used would be compatible with this limited number of lines of scrimmage.

More particularly, the live action football plays are recorded on a football field complete with all markings normally found in an American style football game. All plays originate and complete on one of a limited number of preselected lines of scrimmage. In a preferred embodiment of this variation of the game there is a minimum of 20 lines of scrimmage with this number limited only by the video storage capacity of each game unit and the attendant production and manufacturing costs. This is not intended to place an upper or lower limit on the number of lines of scrimmage covered by this invention since this game format would work for a lower limit of as few as eight lines of scrimmage and an upper limit limited only by the maximum number of lines of scrimmage in an American style football game.

Regardless of the number of lines of scrimmage used, those lines selected will be the only lines of scrimmage used within the game with the exception of certain procedural plays such as kickoffs and converts that always originate from a specific yard line. The selected lines of scrimmage will be the same for both teams and the same but in reverse order for both teams when they play in the opposite direction.

The video play sequence is a basic element of the football game according to the present invention. It is the actual football play itself. The video play sequence will include all runs, passes and kicks (including punts, field goals, converts and kickoffs, i.e. all football plays stored in video).

The video play sequence will consist of two main parts, the play and the replay.

The play portion will always be in real time and start prior to bringing the ball into play and end after the ball is brought out of play with the referee's whistle. If the real time action continues with events such as penalties, injuries, fights etc. the play portion of the video play sequence will continue until no new action pertinent to the game occurs. Shortly after that, the game controllers will prompt their players to call their next decisions for the play.

The replay portion of the video play sequence will always start after the ball has been taken out of play and no more new action pertinent to the game occurs. The replay portion of the play sequence will recap the current play while the players are entering their next game decisions. The replay will always continue to the end of the video play sequence. In this way, the final frame of every video play sequence will always be either in slow motion, a freeze frame or a graphics insert and thus provide a universal edit point back into the real time motion of the beginning of the next video play sequence and avoid visual or audible continuity problems with the edit. The end of the video play sequence will always edit to the next video play sequence with a wipe effect so that it psychologically brings the viewer back into real time without causing time disorientation.

The video play sequence may be stored on laservideo disc, CD-Rom or other storage means in one of the two formats. The first format would be to split the play and replay portions of the play sequence onto two separate discs or storage means. The advantage of splitting the play sequence like this is that only one set of play sequences need be stored. The play portion of the play sequence would "A/B roll" edit to the replay portion stored elsewhere. During the playing of either sequence (i.e. play or replay), the program can then search the other storage means to locate the next sequence to be played.

The alternate format for storing the play sequences would be to store each play sequence intact with both play and replay already edited together. The advantage of this method is that the program needs only locate and edit one complete play eliminating the need to search for a separate matching replay sequence and editing that to the play portion of the play sequence. The disadvantage of this is that in order to "A/B roll" any two video sequences using this format, there must be a duplicate of each video sequence stored on or in a different storage means so that it can be located, cued and then played during playback of the current video sequence. This would double the required video storage space of the program.

When the coin toss sequence is completed and the program returns to the game from the commercial break, the first video play sequence, the opening kickoff, will take place.

Since the game players have already entered their calls for the type of kickoff (i.e. normal or short) during the commercial break at the end of the previous sequence (coin toss), the kickoff play sequence will go ahead without any additional player input. At the end of the kickoff, there will be an instant slow motion replay of the highlights of the current play while the game players are prompted, through their game controllers, to make two decisions.

First, they will be asked to select the type of play they want to call, either a run, pass or kick. They will also be given two other options at this time, time out and quit.

If the player calls time out and they have not used their allowed number of time outs, the game controller will ask if the player is sure (Y,N) and then either pause for the regulation time out period by going to a commercial break or, if told No, the game controller will ignore the time out request and continue with normal play.

Similarly, if a player enters a quit response, the game controller will ask the player if they are sure and then either end the game or continue the play, depending on the response. If a player does quit, the game is awarded, by default, to the other team.

If the players did respond correctly to the "select type of play" input command, they will be asked to enter the type of run, type of pass or type of kick they want to call.

This decision must be entered within a specified time limit. This time limit might be for example 30 seconds; however this may be reduced to as little as 15 or 20 seconds. Regardless of final time limits imposed on the players' decision making process, if the offense does not respond with a play decision within the allotted time period then the game will go to a delay of game video sequence where the announcer will announce that there is some type of holdup on the field and that there will be a short break for a commercial message while the players get back into their huddle.

Upon returning to the game from this commercial break, if a play decision has still not been made by the offense then the game will be called for some unusual reason such as "lack of interest".

In the event of a game termination due to lack of a players play decision response, the software program will store in non-volatile memory all current game data and statistics. In the event of a hardware failure (such as a game controller malfunction) this feature will allow players to resume the game at the same place and in the same situation that existed before the termination.

Termination of a game through a "Quit" response on the game controller will not save the current game position and situation since this will be a willful call on the part of the game players.

If the defense fails to respond to the same input commands, they will be given a default value in the game factors so that their chances for a successful blockage of the next play will be reduced. In other words, they were either too slow in making a defensive call or were caught off guard by the offense speeding up the offensive huddle (see below).

Both game controllers will display a timer that will indicate to the players the amount of time remaining before they are penalized for a late call.

The play sequence will also contain an optional edit out point at some position in the replay portion of the play sequence. There are several uses for this optional edit out point.

First, they can be used to help break up the repetitious sequencing of play/replay in play sequence. Since the cutaway sequences are well over 30 seconds in length they can be randomly inserted at these positions to cutaway to crowd, stadium and player's bench shots.

Second, they can be used for inserts of updates of game statistics or player statistics. During league play, it can also be used for inserting league statistics and live updates.

In both of these examples, the timing of the players input responses would not be changed and the offense would not give a quick response.

This "quick response" is the third example of usage of the optional edit out point. If the offense wants to speed up the pace of the game, they can do so by entering their two play decisions before Frame Position 5, thereby allowing the game control program to end the replay sequence before the maximum time allowed, but since it must always be at least 6 seconds before the actual edit out point, for it to make any difference to the 15 to 20 second prompt period, it will usually be found approximately half-way (or about 7 to 10 seconds) through the replay portion of the play sequence.

They will be given an indication of when their call has been quick enough to end the replay sequence early however, with the same visual cue on the timer display given to the defense (see below).

The defense on the other hand will be given a warning when the offense makes a quick call, the timer on the defensive player's game controller will start flashing and adjust to the remaining time left before the next optional edit out point at Frame Position 5.

This may seem unfair but remember that the offense knows when they have made their inputs and in a real game, they would approach the line of scrimmage and therefore visually warn the defence to hurry up their call so the defense must be given some kind of warning that the quick call has been made.

Figure 5:
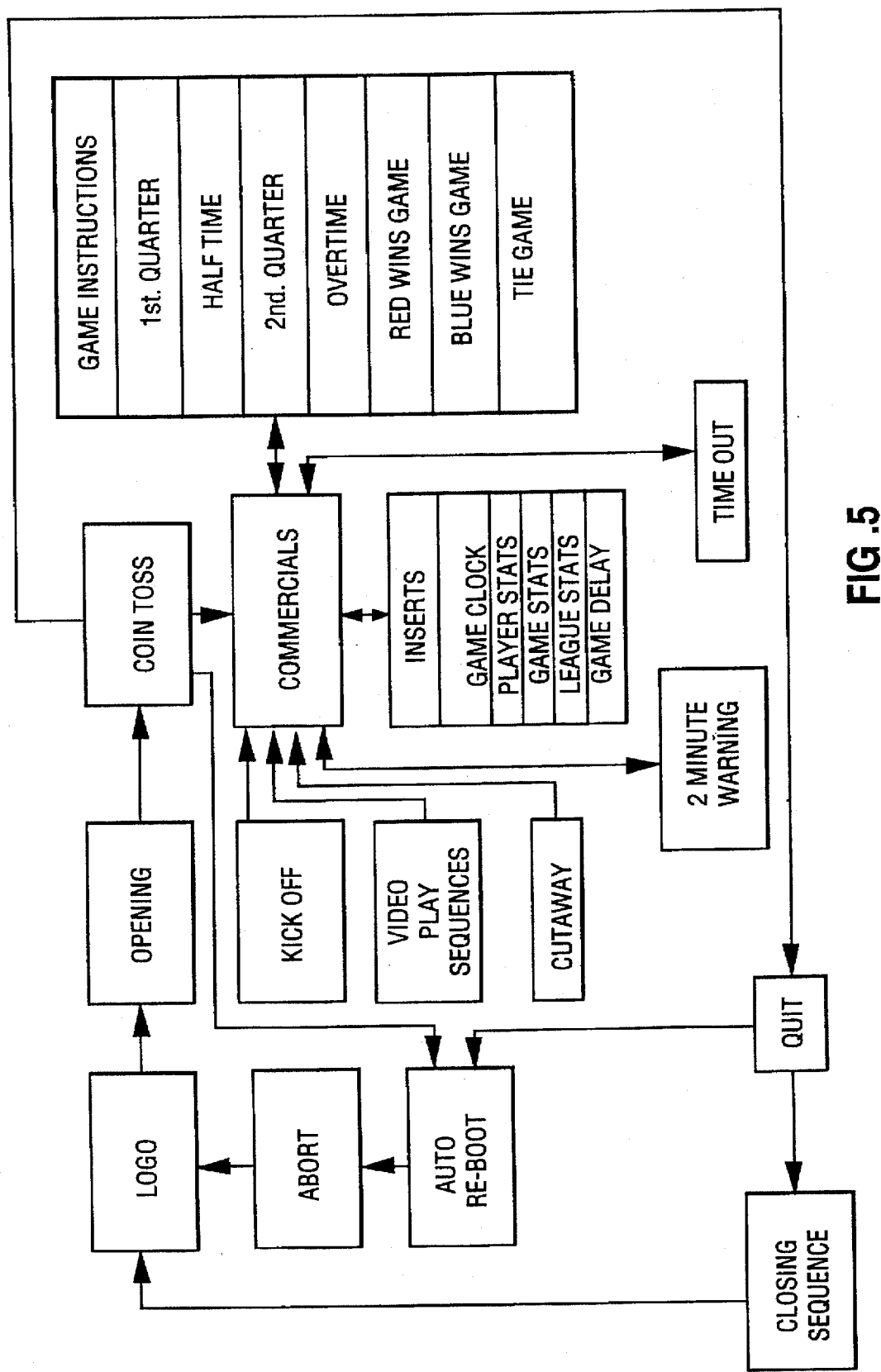
FIG. 5 is a video sequence flow chart showing the various video pathways required in accordance with the invention to link the video sequences together to create a continuous, realtime game.

An example video sequence flow chart is illustrated in FIG. 5, showing the various video pathways that may be provided to link the video sequences together to create a continuous, real time game. (The first video image to appear on the screen after initial bootup, in the illustrated flow chart, is the manufacturer's logo). Commercials and inserts may be included, as illustrated, to help create the illusion that the game is being televised live. The video portion of such inserts might be either wide shots of the stadium and crowds or still pictures of individual players or team logos. These images may be combined with a graphics overlay of the information pertinent to the insert such as a player's statistics, current game statistics such as yards carried, passed, etc. League standing statistics or other information that can be compiled from database information may also be provided. The graphics overlays would be generated by the graphics character generator 22. The video insert could also be a game clock which could be used very effectively during the final moments of a game.

It will be understood that certain game factors may be affected through programming of CPU 4. Those factors include:

1) Team playing factors. Each team will have its own set of playing factors stored in memory. These factors will affect the outcome of the play, for example, a team with a high value of passing will have a better chance for completing a pass play than a team with a low passing play value.

2) Field position. There is an established system for determining the chances of success for a run or pass play according to the field position of that play. This system is used by quarterbacks and coaches to help them determine when it is best to run or pass. We will be using this system or a system similar to it to assign values to a called play according to its field position. This will be most evidenced in field goal attempts.

3) Momentum and Fatigue. As the game progresses, the teams will fatigue. We will already be including player response time in the game factors but we should also consider overall game fatigue so that the more physically demanding plays will be less successful near the end of the quarters and near the end of the game. However, there will be other game situation factors that will also be taken into account such as previous successes. In other words, when a team gets marching down the field, their morale will overcome factors such as fatigue to at least some extent and conversely would probably increase the defense fatigue.

4) Random chance. Not every play will be subject to a random factor, in fact, a random factor will only be occasionally included in the game factors. The frequency of this random factor will probably be less than 1 in 10 plays and possibly as low as 1 in 100 plays. It is included to provide sudden surprises in the play of the game and is not intended to replace the "player vs. player" aspect of the game. When the random factor is occasionally included, its affect on the outcome of the play will vary according to its value. A value of 0 (if it is being added into the equation) or 1 (if it is being multiplied) will have the least effect whereas a value of 100 (or whatever the maximum value used) would have the most effect on the outcome of the play. When this maximum value or near maximum value is used it will overpower the other game factors and, depending on the value of these other factors, be the deciding factor in choosing the outcome of the next play. In this way even the worst possible call from the worst possible field position can result in a great play providing the random factor is used and it's value is sufficiently large enough to overpower the other factors used. (Note: Penalties, fumbles and interceptions will not be determined on a random chance basis.)

When overall game factors are taken into consideration, this should still be a game of skill. When everything else is equal, the player who calls the right plays at the right time should do better than the player who calls it wrong. However, for any single play there will always be that random possibility that even the most novice player can score a touchdown from the worst possible field position. On the other hand, since the random factor is only occasionally used, it is also possible for a novice defensive player to guess exactly what the quarterback is going to do next and block any gains in yardage. A series of good guesses could effectively beat even a skilful experienced player.

In addition, several variations of control modules 6 and other types of input devices are envisaged:

1) Two input devices: This is the system described above and is the simplest form for public use.
2) Four input devices: By introducing four input devices into a bar area one input device can be designated for each offensive and defensive line on each team. In this way, since input devices will probably be physically attached to the table to prevent theft, this will now involve four tables in the bar, actively involving more patrons, making it more attractive to use.
3) Multiple input devices: It could also be beneficial to provide a multiple input system so that every table in the bar can become involved with this system. The microprocessor would determine which play is called by using the most common input. This could work exceptionally well with the following option.
4) Modem TV network: Since this game format will not be generating images in the sense that most "computer game" programs construct images based on current game conditions, the main CPU 4 will be mostly concerned with the sending and receiving of game play instructions and game play statistics, making decisions on which video sequences to play next and the locating and cueing them up for playback. In computer terms this is a relatively easy task and places only a relatively small load on the main CPU 4. Therefore, if two game machines are loaded with the same programs and video/audio sequences, a modem link of microprocessor control commands should be able to produce the same program at both locations at the same time. This would enable networking between game systems in different locations and enable emulation of a closed circuit television network.

Thus it is apparent that there has been provided in accordance with the invention a player interactive live action football game that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. A pre-recorded, live action and sound, full motion video, interactive athletic contest comprising players of opposite teams playing at various positions on a background field, the game comprising:

(a) a random access storage and retrieval means;
    (b) said random access storage and retrieval means for storing a plurality of individual, pre-recorded video images representative of live action plays of the athletic contest illustrating interaction of players of the opposite teams;
    (c) a microprocessor and microprocessor control means electronically associated with said random access storage and retrieval means for enabling one or more users to select in sequence through said control means different ones of said plays according to play type, the microprocessor then, by using statistical tables, to select the video image of the actual play according to play type selected by the user; and
    (d) display means electronically associated with said microprocessor enabling the selected plays to be viewed by the users, said microprocessor further programmed to evaluate and accumulate play results and report them to the users.

2. A game according to claim 1 wherein said random access storage means is selected from the group comprising laser disc, CD-ROM, computer hard drive and optical or magnetic storage means.

3. A game according to claim 1 further provided with audio storage and retrieval means, the audio retrieval means correlated with the individual pre-recorded live action plays and arranged so as to provide audio commentary corresponding to the plays displayed on the display means through speaker means electronically associated with the microprocessor and display means.

4. A game according to claim 1 further provided with audio storage and audio generation means including synthesis means, the audio generation means correlated with the individual pre-recorded live action plays and arranged so as to provide audio commentary corresponding to the plays displayed on the display means through speaker means electronically associated with the microprocessor and display means, said audio further selected to correspond to the yardage related to the play at any given time.

5. A game according to claim 3 wherein a plurality of individual commercial messages are stored in said random access storage means and accessed according to the time which has elapsed during play, said commercial messages to be displayed on said display means at predetermined times, and audio signals to accompany said commercial messages when displayed on said display means.

6. A game according to claim 1 wherein said display means are selected from the group comprising T.V. monitors and display screens.

7. A game according to claim 1 wherein said microprocessor is programmed to provide outcome play results based on stored team statistics incorporating a teams strength, momentum and fatigue.

8. A game according to claim 1, wherein said random access storage means is selected from the group comprising laser disc, CD-ROM, computer hard drive or optical or magnetic storage means, said game being further provided with audio storage and retrieval means, said audio retrieval means correlated with the individual pre-recorded live action football plays and arranged so as to provide audio commentary corresponding to the plays displayed on the display means through speaker means electronically associated with said microprocessor and display means; said display means being selected from the group comprising TV monitors and display screens.

9. A game according to claim 1 wherein the pre-recorded plays are displayed on a normal field that includes markings of yardage lines and numbers, said game then to be played with a limited number of field positions from which the ball can be scrimmaged, the results of each play used therein being compatible with these limited number of field positions.

10. In a video game for generating and displaying on a display device a contest of opposing teams to be played by at least one user, each team comprising at least one character, the contest to be carried out at variable positions on a playing field, apparatus for displaying a selected one of a plurality of first images representing predetermined contest plays, said apparatus comprising:
 (a) means for storing said plurality of first images of contest plays;
 (b) means manually actuated for providing a signal indicative of a selected one of said plurality of first images of the contest plays to be displayed;
 (c) means responsive to said signal for accessing from said storing means the selected one first image of a contest play to be displayed;
 (d) means for determining the variable playing field position as a results of the contest of the selected one first image of a contest play; and
 (e) means for generating a second image relating to text and numerical information representative of cumulative team and player statistics as they apply to a contest in progress; and
 (f) means for superimposing said selected one first image of a contest play and said second image.

11. A pre-recorded, live action and sound with electronically generated graphics overlay, full motion video, interactive game to be played on at least one viewing screen by at least one user, said game comprising:
 (a) random access storage and retrieval means for storing a plurality of individual, pre-recorded football plays illustrating interaction of players of opposite teams, a plurality of individual commercial messages being stored in said random access storage means and accessed according to the time which has elapsed during play;
 (b) a microprocessor and microprocessor control means electronically associated with said random access storage and retrieval means for enabling at least one user to select in sequence through said control means different ones of said plays according to play type, said microprocessor then, by using statistical tables, to select the video image of the actual play according to play type selected by the user, said microprocessor further programmed to evaluate and accumulate play results and report them to the user in a meaningful way; and
 (c) display means electronically associated with said microprocessor for enabling the selected plays to be viewed by the users; said audio storage and retrieval means comprising audio retrieval means correlated with the individual pre-recorded football plays and arranged so as to provide audio commentary corresponding to the plays displayed on said display means through speaker means electronically associated with said microprocessor and display means, said commercial messages to be displayed on said display means at predetermined times, and audio signals to accompany said commercial messages when displayed on said display means;
 the pre-recorded football plays are displayed on a normal field that includes markings of yardage lines and numbers, said game then to be played with a limited number of field positions from which the ball can be scrimmaged, with the results of each play used therein being compatible with these limited number of field positions.

12. A pre-recorded, live action and sound with electronically generated graphics overlay, full motion video, interactive game to be played on at least one viewing screen by at least one user, said game comprising:
 (a) random access storage and retrieval means for storing a plurality of individual, pre-recorded football plays illustrating interaction of players of opposite teams, a plurality of individual commercial messages being stored in said random access storage means and accessed according to the time which has elapsed during play;
 (b) a microprocessor and microprocessor control means electronically associated with said random access storage and retrieval means for enabling at least one user to select in sequence through said control means different ones of said plays according to play type, said microprocessor then, by using statistical tables, to select the video image of the actual play according to play type selected by the user, said microprocessor further programmed to evaluate and accumulate play results and report them to the user in a meaningful way; and
 (c) display means electronically associated with said microprocessor for enabling the selected plays to be viewed by the users; said audio storage and retrieval means comprising audio retrieval means correlated with the individual pre-recorded football plays and arranged so as to provide audio commentary corresponding to the plays displayed on said display means through speaker means electronically associated with said microprocessor and display means, said commercial messages to be displayed on said display means at predetermined times, and audio signals to accompany said commercial messages when displayed on said display means;
 the pre-recorded football plays are displayed on a normal field that includes markings of yardage lines and numbers, said game then to be played with a limited number of field positions from which the ball can be scrimmaged, with the results of each play used therein being compatible with these limited number of field positions, and the pre-recorded football plays are seamlessly displayed in such a manner as to appear to be a live television broadcast.

13. A game according to claim 12 wherein the pre-recorded football plays are provided with mapping means comprising a standardized system of timing, cueing and edit points in order to achieve the seamless display and appearance of a live broadcast.

14. A game according to claim 13 wherein the pre-recorded football plays are provided with control means comprising a standardized system of timing, cueing and edit points so that a last portion of any video sequence being played overlaps a first portion of a next video sequence by a controlled and precise amount so that the next two video sequences can be edited together using video editing techniques selected from the group comprising dissolve, wipes, and other digital video effects.

* * * * *